United States Patent
Lynch

(10) Patent No.: US 9,011,733 B2
(45) Date of Patent: Apr. 21, 2015

(54) DIELECTRIC FLUIDS COMPOSITIONS AND METHODS

(76) Inventor: Joan Lynch, Chicago, IL (US)

(*) Notice: Subject to any disclaimer, the term of this patent is extended or adjusted under 35 U.S.C. 154(b) by 0 days.

(21) Appl. No.: 13/561,275

(22) Filed: Jul. 30, 2012

(65) Prior Publication Data

US 2013/0161577 A1 Jun. 27, 2013

Related U.S. Application Data

(60) Provisional application No. 61/578,792, filed on Dec. 21, 2011.

(51) Int. Cl.
| | |
|---|---|
| *H01B 3/20* | (2006.01) |
| *C09K 5/10* | (2006.01) |
| *C05C 3/00* | (2006.01) |
| *C05C 11/00* | (2006.01) |
| *C05F 11/00* | (2006.01) |
| *C05G 3/00* | (2006.01) |

(52) U.S. Cl.
CPC ................ *C05C 11/00* (2013.01); *C05C 3/005* (2013.01); *C05F 11/00* (2013.01); *C05G 3/00* (2013.01); *Y02E 50/343* (2013.01)

(58) Field of Classification Search
USPC ........................................................ 252/579
See application file for complete search history.

(56) References Cited

U.S. PATENT DOCUMENTS

| | | | | |
|---|---|---|---|---|
| 4,333,740 | A * | 6/1982 | Priegnitz ........................ | 44/453 |
| 5,766,517 | A * | 6/1998 | Goedde et al. ................ | 252/570 |
| 6,340,658 | B1 * | 1/2002 | Cannon et al. ................ | 508/491 |
| 7,497,955 | B2 * | 3/2009 | Scheimann et al. .......... | 210/709 |
| 7,518,006 | B2 * | 4/2009 | Higgins et al. ................ | 554/223 |
| 7,566,469 | B2 * | 7/2009 | Scheimann .................... | 426/424 |
| 2005/0079270 | A1 * | 4/2005 | Scheimann .................... | 426/623 |
| 2007/0210007 | A1 * | 9/2007 | Scheimann et al. .......... | 210/728 |
| 2011/0293785 | A1 * | 12/2011 | Franklin et al. ................ | 426/61 |
| 2011/0294174 | A1 * | 12/2011 | Franklin et al. ............... | 435/134 |

* cited by examiner

*Primary Examiner* — Mark Eashoo
*Assistant Examiner* — M. Reza Asdjodi

(57) ABSTRACT

Green compositions and technologies are provided. In an embodiment, the present invention provides a method of providing dielectric fluids, heat transfer fluids or cooling fluids. The dielectric fluid, heat transfer fluid, or cooling fluid can comprise one or more by-product or co-product containing glyceride and fatty acid mixtures extracted from an ethanol process. In an embodiment, the present invention provides compositions of dielectric fluids, heat transfer fluids or cooling fluids. The dielectric fluid, heat transfer fluid, or cooling fluid can comprise one or more glyceride and fatty acid mixtures extracted from an ethanol process.

12 Claims, No Drawings

DIELECTRIC FLUIDS COMPOSITIONS AND METHODS

CROSS-REFERENCE TO RELATED PATENT APPLICATIONS

This patent application claims the benefit of U.S. Provisional Patent Application No. 61/578,792, filed Dec., 21, 2011, the entire teachings and disclosure of which are incorporated herein by reference thereto.

FIELD OF THE INVENTION

This invention relates generally to methods and compositions useful in green technologies. More specifically, the present invention relates to glycerides and fatty acid mixtures derived from ethanol processes as co-products or by-products. These mixtures can be applied in the present invention for use as a dielectric fluid.

BACKGROUND OF THE INVENTION

Dielectric fluid does not conduct an electric current. It is an electric insulating and cooling material used in many electrical equipment, including transformers, capacitors, regulators, and conductors. Typically, dielectric fluids are derived from petroleum oil. Vegetable oil have been considered as a replacement. The present invention offers an economic alternative.

The present invention can provide heat transfer and cooling mechanism to any process, engine and/or equipment needing heat transfer. The present invention is non-hazardous, is derived from renewable resources, and being a by-product offers economic advantage. It can be used to replace existing dielectric fluids or heat transfer fluids, including coolant fluids.

It is therefore novel, useful, non-obvious, and desirable to provide and utilize cost-effective, non-hazardous, and effective dielectric fluid compositions. It is therefore novel, useful, non-obvious, and desirable to provide and utilize cost-effective, non-hazardous, and effective heat transfer and coolant compositions. The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

At least one embodiment of the invention is directed to compositions of dielectric fluids. The dielectric fluid composition comprises at least one by-product or co-product extracted from an ethanol process.

At least one embodiment of the invention is directed to compositions of heat transfer and coolant fluids.

At least one embodiment of the invention is directed to compositions of dielectric fluids, where the majority of the dielectric fluids comprise by-products of this invention. At least one embodiment of the invention is directed to compositions of dielectric fluids, where the concentration the dielectric fluids comprises by-products of this invention in excess fifty percent by weight. At least one embodiment of the invention is directed to compositions of dielectric fluids, where the dielectric fluids comprise by-products of this invention, and other dielectric fluids and/or additives. The additive can include freeze point depressants.

At least one embodiment of the invention is directed to methods of using insulating, heat transfer, and cooling fluids, where the majority of the dielectric fluids comprises by-products of this invention.

At least one embodiment of the invention is directed to methods of dielectric fluids, heat transfer fluids, and cooling fluids, where the concentration the dielectric fluids, heat transfer fluids, and cooling fluids comprises by-products of this invention in excess of fifty percent by weight. At least one embodiment of the invention is directed to methods of dielectric fluids, heat transfer fluids, and cooling fluids, where the dielectric fluids, heat transfer fluids, and cooling fluids comprises by-products of this invention and other dielectric fluids, heat transfer fluids, and cooling fluids and/or additives. The additive can include freeze point depressants.

The by-product or co-product from ethanol manufacturing, or glycerides and fatty acid mixtures, may contain from 5 percent by weight to 25 percent by weight free fatty acids. The glycerides and fatty acid mixtures may comprise one or more component selected from a list of linoleic acid, phytosterols, hydroxycinnamatesteryl esters, lutein, and zeaxanthin. The glyceride and fatty acid mixtures may be extracted from the thin stillage of a dry mill corn ethanol plant or from the distillers grains and solubles of a dry mill corn ethanol plant. The hydroxycinnamate steryl esters concentration may range from 0.3 to 0.5 weight percent. The tocopherols concentration may be less than 150 mg per 100 g of glycerides and fatty acid mixtures. In an embodiment the tocopherols' concentration is 150 mg per 100 g of glycerides and fatty acid mixtures or less.

The by-product or co-product containing fatty glyceride and fatty acid mixtures may be applied as an emulsion. The glycerides and fatty acid mixtures, or by-products, may be combined with other existing dielectric fluids, heat transfer fluids, cooling fluids, and additives. At least a portion (up to 100%) of the glycerides and fatty acid mixtures may be extracted from an ethanol process. The glycerides and fatty acid mixtures may further comprise one or more component selected from a list of linoleic acid, phytosterols, tocopherols, hydroxycinnamatesteryl esters, lutein, zeaxanthin, carotenoids, and any combination thereof. The glyceride and fatty acid mixtures may be extracted from the thin stillage of a dry mill corn ethanol plant or from the distillers grains and solubles of a dry mill corn ethanol plant. The hydroxycinnamate steryl esters concentration may be within the range of 0.3 to 0.5 weight percent. The tocopherols concentration may be less than 150 mg per 100 g of glycerides and fatty acid mixtures.

Additional features and advantages are described herein, and will be apparent from the following Detailed Description.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

For purposes of this application the definition of these terms is as follows: "Dielectric" means an electric insulator that can be polarized by an applied electric field. When a dielectric is placed in an electric field, electric charges do not flow as they do in a conductor. Dielectric is typically used to describe materials with high polarizability. Insulator implies low electrical conduction. Dielectric fluids can provide cooling or heat transfer properties.

"Glycerides and fatty acid mixtures" means mixtures extracted from an ethanol process comprising both glycerides and fatty acid. These mixtures are by-products or co-product of an ethanol manufacturing process.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology,* 5th Edition, (2005), (Published by Wiley, John & Sons, Inc.) this definition shall control how the term is to be defined in the claims.

In at least one embodiment, the invention provides a method of using by products from ethanol manufacturing as a dielectric fluid. The dielectric fluid composition can comprise one or more glycerides and fatty acid mixtures derived from an ethanol process.

In at least one embodiment, the co-product or by-product that comprises glycerides and fatty acid mixtures can be generated from an ethanol process. In an ethanol process, the extraction of the glycerides and fatty acid mixtures can be referred to as corn oil extraction. One method of extracting corn oil is through recovery from the stillage and/or the distillers grains and solubles produced by a dry corn ethanol plant. In an embodiment, the glycerides and fatty acid mixtures contains about 5 to 25 weight percent free fatty acids. In another embodiment the by-product or co-product contains 5% free fatty acids by weight or greater. Linoleic acid is typically the predominant fatty acid. The glycerides and fatty acid mixtures can contain other components that include phytosterols, hydroxycinnamate steryl esters, lutein, and zeaxanthin.

In at least one embodiment, the glyceride and fatty acid mixtures are extracted from an ethanol process. In an embodiment, the glyceride and fatty acid mixtures contain linoleic acid.

In at least one embodiment, the dielectric fluid composition comprises one or more glycerides and fatty acid mixtures derived from an ethanol manufacturing process. In an embodiment the ethanol process is a fuel ethanol process. In an embodiment the ethanol process is a food or beverage ethanol process.

An advantage of the present invention is to provide cost-effective dielectric fluids, heat transfer fluids or cooling fluids.

In at least one embodiment, the dielectric fluid, heat transfer fluid, and/or cooing fluid's composition comprises glycerides and fatty acid mixtures. The glycerides and fatty acid mixtures can comprise linoleic acids and one or more components selected from a list comprising of phytosterols, tocopherols, hydroxycinnamate steryl esters, lutein, zeaxanthin, and carotenoids.

The by-product or co-product or glycerides and fatty acids mixtures are generally environmentally benign and non-hazardous. The glycerides and fatty acid mixtures are also non-combustible and can provide benefits in applications where there is a "high" flash point requirement. The by-products can be used to supplement or replace conventional dielectric fluids, heat transfer fluids, or cooling fluids thereby reducing the dependency on such environmentally unfriendly material.

The present invention offers an added benefit of not posing any environmental and/or human health hazard if discharged into the environment.

In at least one embodiment the glycerides and fatty acid mixtures are co-products or by-products of an ethanol process. They are considered green compositions because they are non-hazardous and are derived from natural, renewable resources. These renewable resources include corn crop.

Algae can be used to produce ethanol. The by-product of the present invention can be derived from ethanol produced from algae.

Ethanol can be derived from corn utilizing a dry milling process, where the entire corn kennel is ground into flour, and mixed with water. Enzymes are added to convert the starch to sugar. Yeast is then added to convert the sugar to ethanol. The solution, commonly referred to as wash, meal, beer mash or sour mash, is then distilled separating the ethanol from the remaining portion or stillage, commonly referred to as the whole stillage, thick stillage, or thick slop. The nonfermentable parts are separated. The solids are combined into feed co-product called distillers dried grain with solubles (DDGS). The liquid portion, which can contain some solids, is referred to as the thin stillage. Glyceride and fatty acid mixtures can be extracted from the thin stillage and/or the DDGS. The present invention or by-product or co-product can be referred to as "post fermentation corn oil".

Because vegetable oils are produced by solvent extraction; some of the impurities in the crude oil, such as free fatty acids and phospholipids, are removed from crude vegetable oils by alkali refining and precipitation. This makes the present invention differs from vegetable oil or edible oil. The present invention differs from the commercial vegetable oils. The commercial vegetable oils are refined, bleached and deodorized (RBD). Generally, RBD commercial corn oil contains zero free fatty acids. As a result, the prior art teaches away any intent to utilize the glycerides and fatty acid mixtures derived from an ethanol process.

U.S. Pat. Nos. 7,497,955 and 7,566,469 and U.S. patent application Ser. No. 12/949850 disclose methods of dewatering thin stillage from an ethanol process utilizing polymers. The present invention can be extracted from different phases of the ethanol process. Various methods are disclosed for improving the capture efficiency of the oil from several streams of the ethanol process such as the dry milling process of making both food and fuel grade ethanol from corn. In at least one embodiment, in an ethanol process, ethanol is retrieved from the beer mash in a stripper column and the remaining corn stillage solids are dewatered and a rich supply of glycerides and fatty acid mixtures are recovered from the corn stillage solids.

In at least one embodiment, glycerides and fatty acid mixtures are derived as a by-product from an ethanol process. As described in a published article—"*The Composition of Crude Corn Oil Recovered after Fermentation via Centrifugation from a Commercial Dry Grind Ethanol Process*", Jul. 26, 2010, [Journal of the American Oil Chemists' Society, 87:895-902; authors are Robert Moreau, Kevin Hicks, David Johnston, and Nathan Laun] the composition of these by-products are quite different from commercial corn oil and unrefined corn oil, and as a result, the present invention marked effectiveness is unexpected. For example, the levels of free fatty acids in the post fermentation corn oil are higher than in the RBD oil or unrefined oil. The levels of free sterols and hydroxycinnamate steryl esters in the present invention are also higher than in commercial oil. Levels of hydroxycinnamate steryl esters in the by-product ranged about 0.3 to 0.5 weight percent, while levels of hydroxycinnamate in commercial corn oil was non-detected. Moreover, the carotenoids levels are much higher in the by-product at concentrations above 250 micrograms per gram of by-product. In an embodiment, the carotenoids level is 250 micrograms per gram of by-product, or greater.

Moreover, because of the exposure to all upstream processes of a fuel ethanol plant, including high-temperature liquefaction, saccharification, and fermentation, the byproduct has lowered levels of tocopherols. Tocopherols in commercial vegetable oil that is unrefined were reported to be about 319 mg per 100 g of oil. Tocopherols in the present invention averaged about 100 mg per 100 g of oil.

Recent federal ruling mandates that 15 billion gallons of corn based ethanol are to be used in commerce by 2022. EPA recognized extraction of the glycerides and fatty acid stream from a fuel ethanol processes is beneficial in terms of ethanol process improvements and lowering greenhouse gas emissions from a holistic ethanol life cycle perspective. One benefit is utilizing the glycerides and fatty acid mixtures as a feedstock to make biodiesel. It is estimated that 0.5 pound to 1.4 pound of glycerides and fatty acid mixtures can be derived from a bushel of corn used for ethanol production.

In at least one embodiment, the invention provides methods of utilizing the by-product in dielectric, heat transfer and cooling applications. The dielectric fluid compositions can also be used in conjunction with other suitable dielectric fluid additives. The additive can include freeze point depressants. The glycerides and fatty acid mixtures can be used in dielectric applications, or heat transfer or cooling applications.

In at least one embodiment, the method includes utilizing the by-product in dielectric fluid applications. The dielectric fluid composition can comprise one or more glycerides and fatty acid mixtures.

In at least one embodiment the glycerides and fatty acid mixtures is applied as an emulsion. Emulsions of the glyceride and fatty acid mixtures can help to disperse the mixtures, obtaining similar performance at less active concentration. The emulsion can contain an emulsion stabilizing reagent.

While this invention may be embodied in many different forms described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A composition of dielectric fluid wherein the dielectric fluid composition comprises at least one by-product or co-product comprising glycerides and fatty acid mixtures extracted from an ethanol process, wherein the composition further comprises a free fatty acid, and wherein the free fatty acid concentration is about 5%.

2. The composition of claim 1, wherein the glycerides and fatty acid mixtures contain 5 percent by weight of free fatty acids or greater.

3. The composition of claim 2, wherein the glyceride and fatty acid mixtures is extracted from one of the thin stillage of a dry mill corn ethanol plant or from the distillers grains and soluble of a dry mill corn ethanol plant.

4. The composition of claim 1, wherein the glycerides and fatty acid mixtures further comprise one or more component selected from a list consisting of linoleic acid, phytosterols, tocopherols, hydroxycinnamate steryl esters, lutein, —zeaxanthin, and carotenoids.

5. The composition of claim 4, wherein the tocopherols' concentration is 150 mg per 100 g of glycerides and fatty acid mixtures, or less.

6. The composition of claim 4, wherein the carotenoids' concentration is 250 microgram per gram of glycerides and fatty acid mixtures, or greater.

7. The composition of claim 1, wherein the glycerides and fatty acid mixtures are combined with one or more of dielectric fluid.

8. A dielectric composition comprising at least one glycerides and fatty acid mixtures extracted from an ethanol process, wherein the mixtures further comprise free fatty acids and wherein the free fatty acid concentration is about 5%.

9. The composition of claim 8, wherein the glycerides and fatty acid mixtures further comprise one or more component selected from the group consisting of linoleic acid, phytosterols, tocopherols, hydroxycinnamatesteryl esters, lutein, —zeaxanthin, and carotenoids.

10. The composition of claim 9, wherein the tocopherols' concentration is 150 mg per 100 g of glycerides and fatty acid mixtures, or less.

11. The composition of claim 9, wherein the carotenoids' concentration is 250 microgram per gram of glycerides and fatty acid mixtures, or more.

12. The composition of claim 8, wherein the glyceride and fatty acid mixtures is extracted from one of the thin stillage of a dry mill corn ethanol plant or from the distillers grains and solubles of a dry mill corn ethanol plant.

* * * * *